United States Patent
Shchur et al.

(10) Patent No.: US 11,341,729 B2
(45) Date of Patent: May 24, 2022

(54) METHOD AND ELECTRONIC DEVICE FOR CORRECTING EXTERNAL REALITY PIXELS AND VIRTUAL CONTENT PIXELS WITHIN AN AUGMENTED REALITY ENVIRONMENT

(71) Applicant: SAMSUNG ELECTRONICS CO., LTD., Suwon-si (KR)

(72) Inventors: Oleksandr Shchur, Kyiv (UA); Oleksandr Radomskyi, Kharkov (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/059,881

(22) PCT Filed: Aug. 1, 2018

(86) PCT No.: PCT/KR2018/008737
§ 371 (c)(1),
(2) Date: Nov. 30, 2020

(87) PCT Pub. No.: WO2019/245102
PCT Pub. Date: Dec. 26, 2019

(65) Prior Publication Data
US 2021/0217243 A1 Jul. 15, 2021

(30) Foreign Application Priority Data
Jun. 22, 2018 (KR) .................. 10-2018-0072346

(51) Int. Cl.
G06T 19/00 (2011.01)
G02B 27/14 (2006.01)
G06T 5/00 (2006.01)

(52) U.S. Cl.
CPC ............ G06T 19/006 (2013.01); G02B 27/14 (2013.01); G06T 5/005 (2013.01)

(58) Field of Classification Search
None
See application file for complete search history.

(56) References Cited

U.S. PATENT DOCUMENTS

| 8,643,950 B2 | 2/2014 | Konig |
| 2013/0101175 A1* | 4/2013 | Lynch ................ G01C 21/3638 |
| | | 382/106 |

(Continued)

FOREIGN PATENT DOCUMENTS

KR 10-1852680 B1 4/2018

OTHER PUBLICATIONS

International Search Report (PCT/ISA/210) and Written Opinion (PCT/ISA/237) dated Mar. 18, 2019 by the International Searching Authority in International Application No. PCT/KR2018/008737.

(Continued)

*Primary Examiner* — Steven Z Elbinger
(74) *Attorney, Agent, or Firm* — Sughrue Mion, PLLC

(57) ABSTRACT

A method and electronic device for displaying content for implementing augmented reality or mixed reality are provided.

The method includes obtaining a reality image by photographing external reality, obtaining content to be overlapped with the external realty and be displayed, identifying an area overlapping with the content in the reality image, correcting pixel values of the reality image in the identified area, correcting the content based on the reality image of which the pixel values have been corrected in the identified area, and displaying the corrected content.

9 Claims, 13 Drawing Sheets

(56) References Cited

U.S. PATENT DOCUMENTS

| | | |
|---|---|---|
| 2016/0210784 A1 | 7/2016 | Ramsby et al. |
| 2017/0171533 A1 | 6/2017 | Benitez et al. |
| 2017/0200318 A1 | 7/2017 | Kruglick |
| 2017/0270707 A1* | 9/2017 | Kass ............... G06T 11/001 |
| 2017/0278289 A1* | 9/2017 | Marino ............ G06T 11/60 |
| 2018/0092698 A1* | 4/2018 | Chopra ............ G06F 1/163 |
| 2018/0262745 A1* | 9/2018 | Cole ............... H04N 13/156 |
| 2019/0349575 A1* | 11/2019 | Knepper .......... G06F 1/1694 |

OTHER PUBLICATIONS

Christian Weiland et al., "Colorimetric and Photometric Compensation for Optical See-Through Displays", 2009, 10 pages total, XP047541222.

Tobias Langlotz et al., "Real-Time Radiometric Compensation for Optical See-Through Head-Mounted Displays", IEEE Transactions on Visualization and Computer Graphics, vol. 22, No. 11, Nov. 2016, 10 pages total, XP011623600.

Jae-Woo Kim et al., "[Poster] Optimizing Background Subtraction for OST-HMD", 2017 IEEE International Symposium on Mixed and Augmented Reality Adjunct Proceedings, IEEE, Dec. 2017, 2 pages total, XP033242535.

Communication dated Jul. 29, 2021 issued by the European Intellectual Property Office in counterpart European Application No. 18923098.0.

* cited by examiner

METHOD AND ELECTRONIC DEVICE FOR CORRECTING EXTERNAL REALITY PIXELS AND VIRTUAL CONTENT PIXELS WITHIN AN AUGMENTED REALITY ENVIRONMENT

TECHNICAL FIELD

The disclosure relates to a method and electronic device for displaying content, and more particularly, to a method for overlapping virtual content for implementing augmented reality or mixed reality based on external reality.

BACKGROUND ART

Recently, along with the development of electronic devices and displays capable of implementing virtual reality (VR), interest in virtual reality is growing. As the next stage of VR, a technology for realizing augmented reality (AR) and mixed reality (MR) has been studied.

AR is a display technology of increasing the effect of a real-world environment by overlapping or combining a virtual object or information with an environment of the real world, unlike the VR that is subject to a full-virtualized world. VR has been limited to applications to specific fields, such as games or virtual experiences, whereas AR is applicable to various real-world environments. Particularly, AR has received attention as the next-generation display technology suitable for ubiquitous environments or internet of things (IoT) environments.

Taking it a few steps further, a technology for combining a real world-environment with information of the virtual world to create a space where both worlds are merged is called 'mixed reality' (MR). MR, which is a kind of AR, has the advantages of both AR and VR. MR is characterized in that it combines virtual information with the real world.

AR or MR can be implemented on various devices. According to an embodiment, AR or MR may be implemented on a translucent mirror such as a hologram lens through which an external real-world environment is transmitted and shown. For example, content for implementing AR or MR is projected on a translucent mirror, and a user recognizes both the content and external real-world environment through the translucent mirror to experience AR or MR.

However, content overlapping with the external real-world environment on a translucent mirror is distorted due to the colors of the external real-world environment.

DESCRIPTION OF EMBODIMENTS

Technical Solution to Problem

An embodiment provides a method and electronic device for displaying content for implementing augmented reality or mixed reality while minimizing content distortion caused by an external real-world environment.

Advantageous Effects of Disclosure

According to an embodiment, content for implementing augmented reality or mixed reality may be displayed without being distorted by an external real-world environment.

BEST MODE

Figure 1:
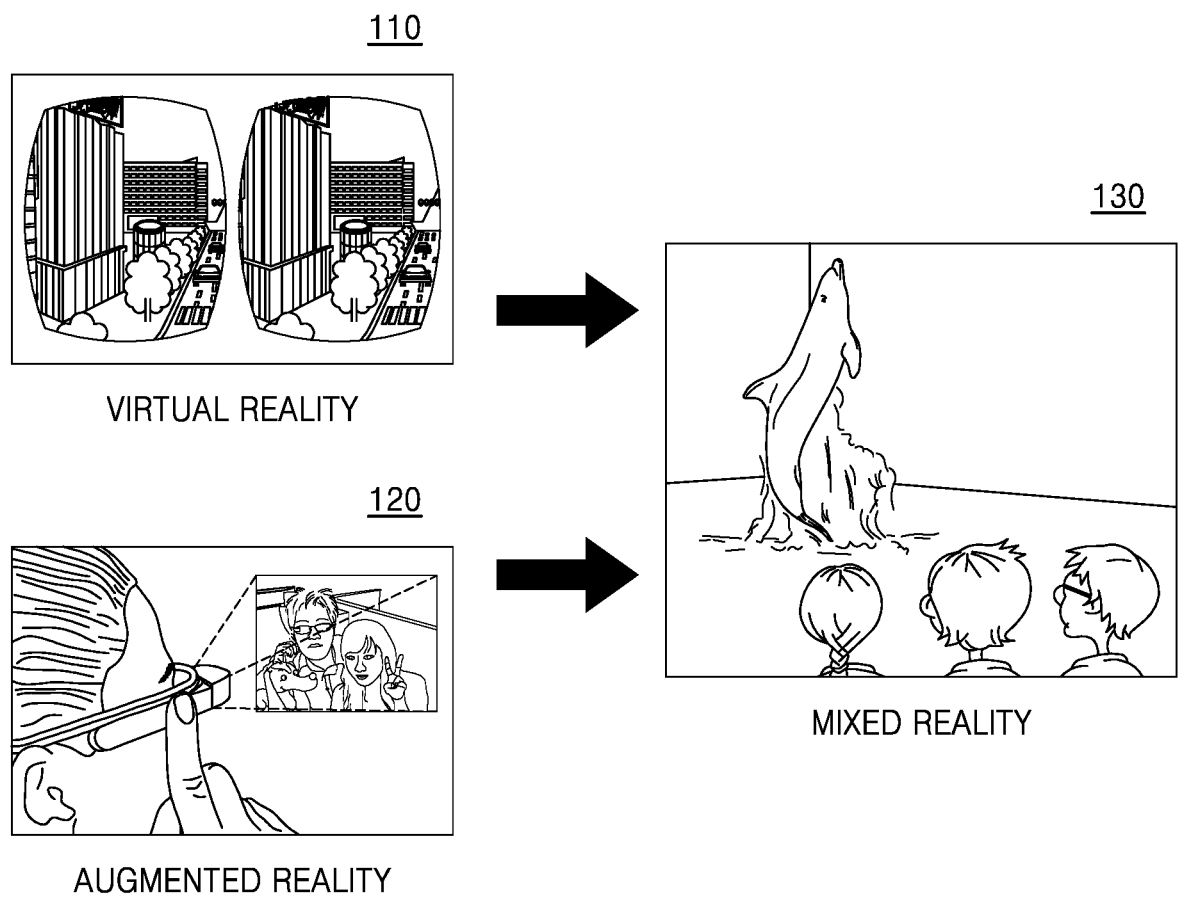
FIG. 1 shows examples of virtual reality, augmented reality, and mixed reality, according to an embodiment.

As technical means for overcoming the above-described technical problem, a first aspect of the disclosure discloses a method for displaying content on an electronic device, the method including: obtaining a reality image by photographing external reality; obtaining content to be overlapped with the external realty and be displayed; identifying an area overlapping with the content in the reality image; correcting pixel values of the reality image in the identified area; correcting the content based on the reality image of which the pixel values have been corrected in the identified area; and displaying the corrected content.

A second aspect of the disclosure discloses an electronic device including: a display; a camera; a memory storing one or more instructions; and a processor configured to execute the one or more instructions stored in the memory, wherein the processor is further configured to control the camera to obtain a reality image by photographing external reality, obtain content to be overlapped with the external realty and be displayed, identify an area overlapping with the content in the reality image, correct pixel values of the reality image in the identified area, correct the content based on the reality image of which the pixel values have been corrected in the identified area, and control the display to display the corrected content.

A third aspect of the disclosure provides a computer program product including a recording medium storing a program for performing the method of the first aspect.

MODE OF DISCLOSURE

Hereinafter, embodiments of the disclosure will be described in detail with reference to the accompanying drawings so that the disclosure may be readily implemented by those skilled in the art. However, the disclosure is not restricted by these embodiments but can be implemented in many different forms. Also, in the drawings, parts irrelevant to the description are omitted for the simplicity of explanation, and like reference numerals refer to like elements throughout the specification.

It will be understood that when a component is referred to as being "connected" to another component, it can be "directly connected" or "electrically connected" to the other component with an intervening component. Also, it will be understood that when a certain part "includes" a certain component, the part does not exclude another component but can further include another component, unless the context clearly dictates otherwise.

Hereinafter, the disclosure will be described in detail with reference to the accompanying drawings.

FIG. 1 shows examples of virtual reality, augmented reality, and mixed reality, according to an embodiment.

Virtual reality (VR) means technology for displaying a virtual world existing temporally or spatially remote or not existing in reality through a display. In virtual reality, virtual reality content displayed on a display is output through a virtual reality lens to a user, as shown in 110 of FIG. 1, so that the user can experience the virtual reality and be immersed in the virtual reality.

Augmented reality (AR) is technology derived from a field of VR and combining a real world with a virtual world. The augmented reality technology synthesizes a virtual object with a real environment to make the virtual object look like a real object existing in the real environment. For example, as shown in 120 of FIG. 1, augmented reality may be implemented by overlapping a virtual object created by computer technology with a real world and outputting the result of the overlapping for a user.

Mixed reality (MR) is implemented by combining augmented reality with virtual reality, and the mixed reality is technology of mixing an object of a real environment with virtually generated information (for example, computer graphic information, sound information, haptic information, smell information, etc.) in real time to interact with users. For example, as shown in 130 of FIG. 1, mixed reality technology realistically shows an image generated by a computer.

The disclosure relates to a method for displaying content for implementing augmented reality or mixed reality as described above. Hereinafter, the method for displaying content will be described.

Figure 2:
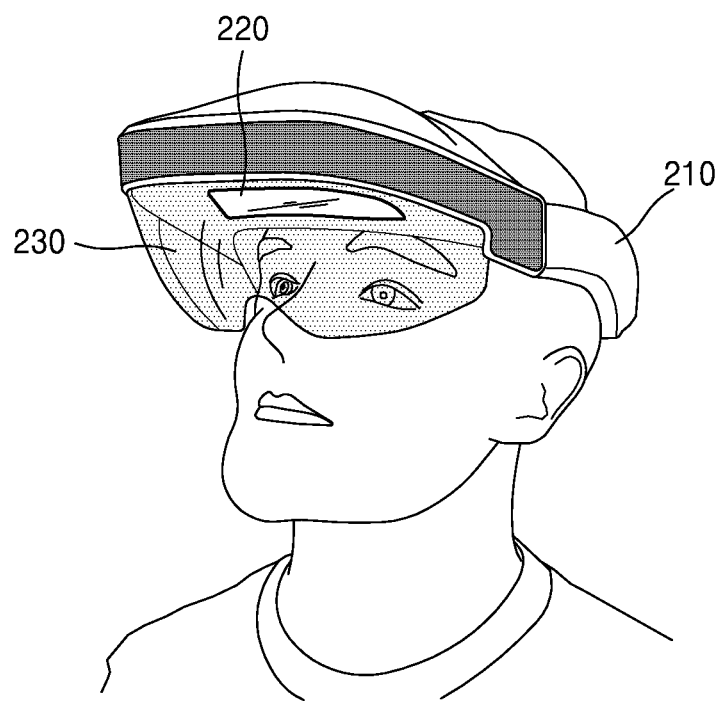
FIG. 2 shows a user wearing an optical device that implements augmented reality or mixed reality according to an embodiment.

FIG. 2 shows a user wearing an optical device that implements augmented reality or mixed reality according to an embodiment.

Referring to FIG. 2, an optical device 210 for implementing augmented reality or mixed reality may include an electronic device 220 for displaying content for implementing augmented reality or mixed reality, and a translucent mirror 230 for overlapping content with external reality to display the content overlapping with the external reality. According to an embodiment of the disclosure, when content displayed on a display of the electronic device 220 is projected on the translucent mirror 230, a user may recognize the content together with external reality through the translucent mirror 230. Because content overlaps with external reality and is displayed on the translucent mirror 230, the user may experience augmented reality or mixed reality.

The optical device 210 may be mounted on the user's head, as shown in FIG. 2, so that the user can see the external reality and the content displayed on the electronic device 220 through the translucent mirror 230.

The translucent mirror 230 may reflect the content projected from the electronic device 220 toward the user's eyes, while showing the external reality outside the translucent mirror 230.

Figure 3:
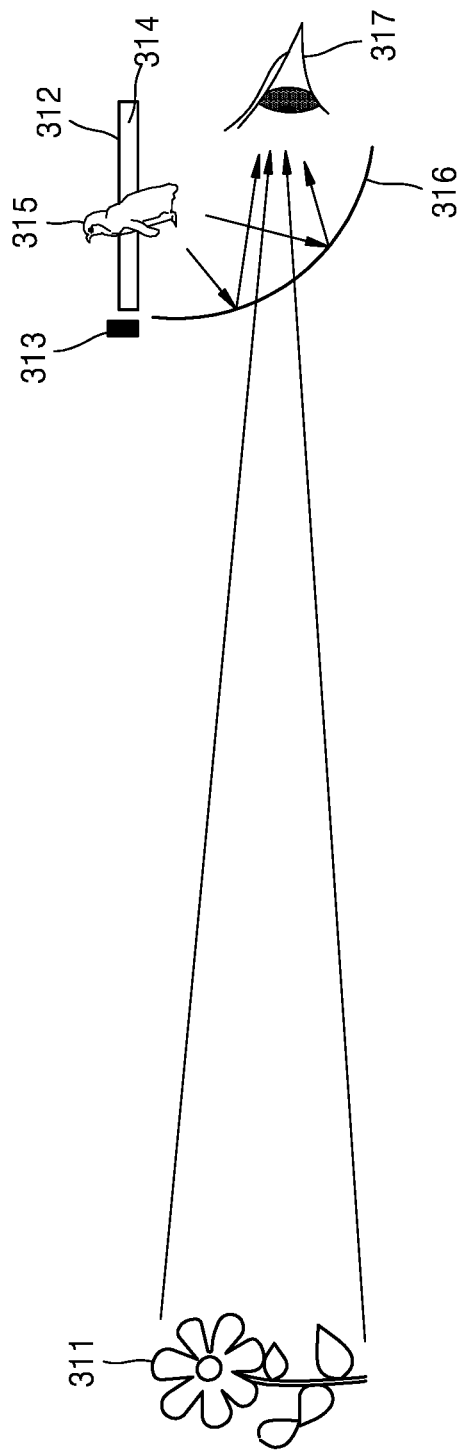
FIG. 3 shows an example in which augmented reality or mixed reality is implemented, according to an embodiment.

FIG. 3 shows an example in which augmented reality or mixed reality is implemented, according to an embodiment.

A translucent mirror 316 and an electronic device 312 shown in FIG. 3 may respectively correspond to the translucent mirror 230 and the electronic device 220 of FIG. 2.

Referring to FIG. 3, content 315 may overlap with an external object 311 and be displayed on the translucent mirror 316, and a user's eye 317 may recognize the external object 311 and the content 315 displayed on the translucent mirror 316.

The content 315 may be virtual content for providing the user's eye with augmented reality or mixed reality. The content 315 may be projected on the translucent mirror 316 by the electronic device 312, and overlap with the external object 311 on the translucent mirror 316.

The translucent mirror 316 may be a beam splitter that reflects a part of light and transmits the other part of the light.

The electronic device 312 may include a camera 313 and a display 314. The electronic device 312 may be a mobile device including a mobile phone and a tablet personal computer (PC), or a computing device including a central processing unit (CPU). The electronic device 312 may further include a processor (not shown) for controlling operations of the camera 313 and the display 314, and a memory (not shown) storing data for the operations of the camera 313 and the display 314.

The camera 313 may photograph the external object 311 that is recognized by the user's eye 317 through the translucent mirror 316. According to an embodiment, an image obtained by photographing the external object 311 may be used to correct the content 315 displayed on the translucent mirror 316 such that the content 315 is not distorted by the external object 311.

The display 314 may display content for providing augmented reality or mixed reality. The content displayed on the display 314 may be projected on the translucent mirror 316, and the user may see the content projected on the translucent mirror 316.

Figure 4:
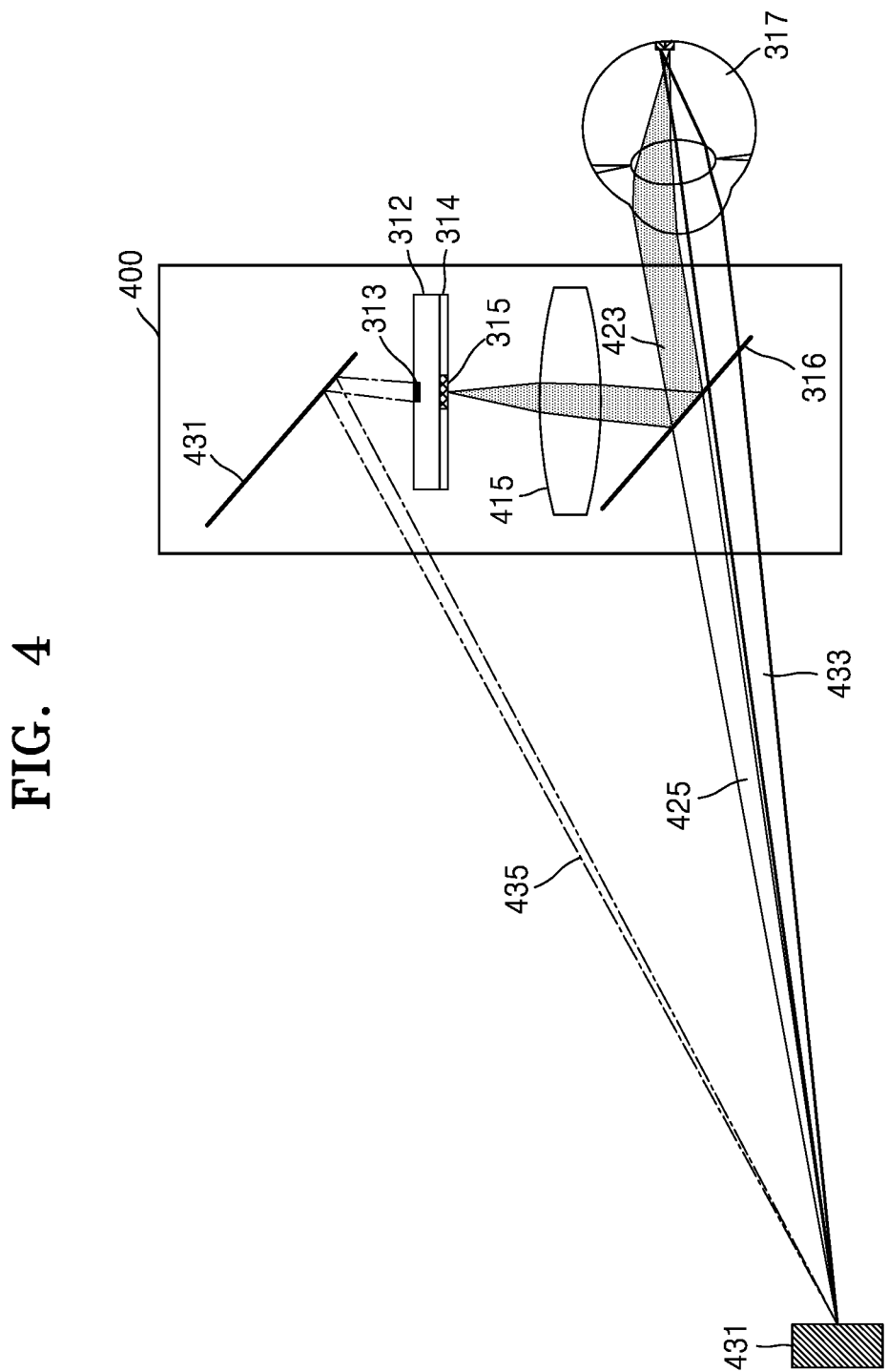
FIG. 4 shows an example of an optical device and an electronic device for implementing augmented reality or mixed reality, according to an embodiment.

FIG. 4 shows an example of an optical device and an electronic device for implementing augmented reality or mixed reality, according to an embodiment.

An optical device 400 for implementing augmented reality or mixed reality may include a lens 415, a mirror 431, and the translucent mirror 316. The optical device 400 shown in FIG. 4 may further include the mirror 431 and the lens 415, unlike the example shown in FIG. 3.

The electronic device 312 may be a mobile smart device capable of being attached to or detached from the optical device 400. The electronic device 312 may be attached to the optical device 400 to provide a user with an environment to enable the user to experience augmented reality or mixed reality. Also, the electronic device 312 may be a standalone device that is independent from the optical device 400. The electronic device 312 according to an embodiment may include the camera 313 and the display 314. Also, the electronic device 312 may further include a processor (not shown) for controlling operations of the camera 313 and the display 314, and a memory (not shown) storing data for the operations of the camera 313 and the display 314.

The camera 313 may receive a reality signal 435 reflected by the mirror 431 to photograph an external object 431 that can be recognized by the user's eye 317 through the translucent mirror 316. According to an embodiment of the disclosure, an image obtained by photographing the external object 431 may be used to correct the content 315 displayed on the translucent mirror 316.

The content 315 corrected according to an embodiment may be output by the electronic device 312 so that the user can recognize the content 315 with minimized distortion caused by the external object 431 through the translucent mirror 316.

The display 314 may display the content 315 for providing augmented reality or mixed reality. According to an embodiment, a signal 423 for the content 315 displayed on the display 314 may pass through the lens 415, be reflected by the translucent mirror 316, and then recognized by the user's eye 317.

The user's eye 317 may recognize a reality signal 433 for the external object 431 through the translucent mirror 413. Also, the user's eye 317 may recognize the signal 423 according to the content 315 for providing augmented reality or mixed reality. Accordingly, the user's eye 317 may recognize the signal 423 for the content 315 according to augmented reality or mixed reality, together with the reality signal 435 for the external object 431. Thereby, the user may recognize the content 315 overlapping with the external object 431, and the external object 431, simultaneously.

The translucent mirror 316 may transmit the reality signal 433 from the reality object 431, and output the reality signal 433 to the user's eye 317. Also, the translucent mirror 316 may reflect the signal 423 for the content 315 according to augmented reality or mixed reality, projected from the display 314, so that the signal 423 can be recognized by the user's eye 317.

The translucent mirror 316 may be combined at a predefined angle with a part of the optical device 400. For example, the translucent mirror 316 may be positioned at a location being suitable to transmit the reality signal 433 from the external object 431 and output the reality signal 433 to the user's eye 317, while being suitable to reflect the signal 423 for the content 315 according to augmented reality or mixed reality and output the signal 423 to the user's eye 317.

The mirror 431 may reflect the reality signal 435 for the external object 431 and output the reality signal 435 to the camera 313. The mirror 431 may be combined at a predefined angle with a part of the optical device 400. For example, the mirror 431 may be positioned at a location capable of reflecting the reality signal 435 such that the camera 313 photographs an image including the same shape as that of a shape of the external object 431 recognized by the user through the translucent mirror 316.

The lens 415 may refract the signal 423 for the content 315 displayed on the display 314, and output the refracted signal 423 to the users eye 317. Thereby, the users eye 317 may receive the signal 423 for the content 315 to recognize the content 315 for augmented reality or mixed reality. For example, the lens 415 may enlarge the signal 423 for the content 315 and output the enlarged signal 423 to the translucent mirror 316. However, the above-described operation may be only an example that can be performed by the lens 415, and, according to various embodiments, the lens 415 may output the signal 423 for the content 315 as it is, or reduce and output the signal 433.

Figure 5:
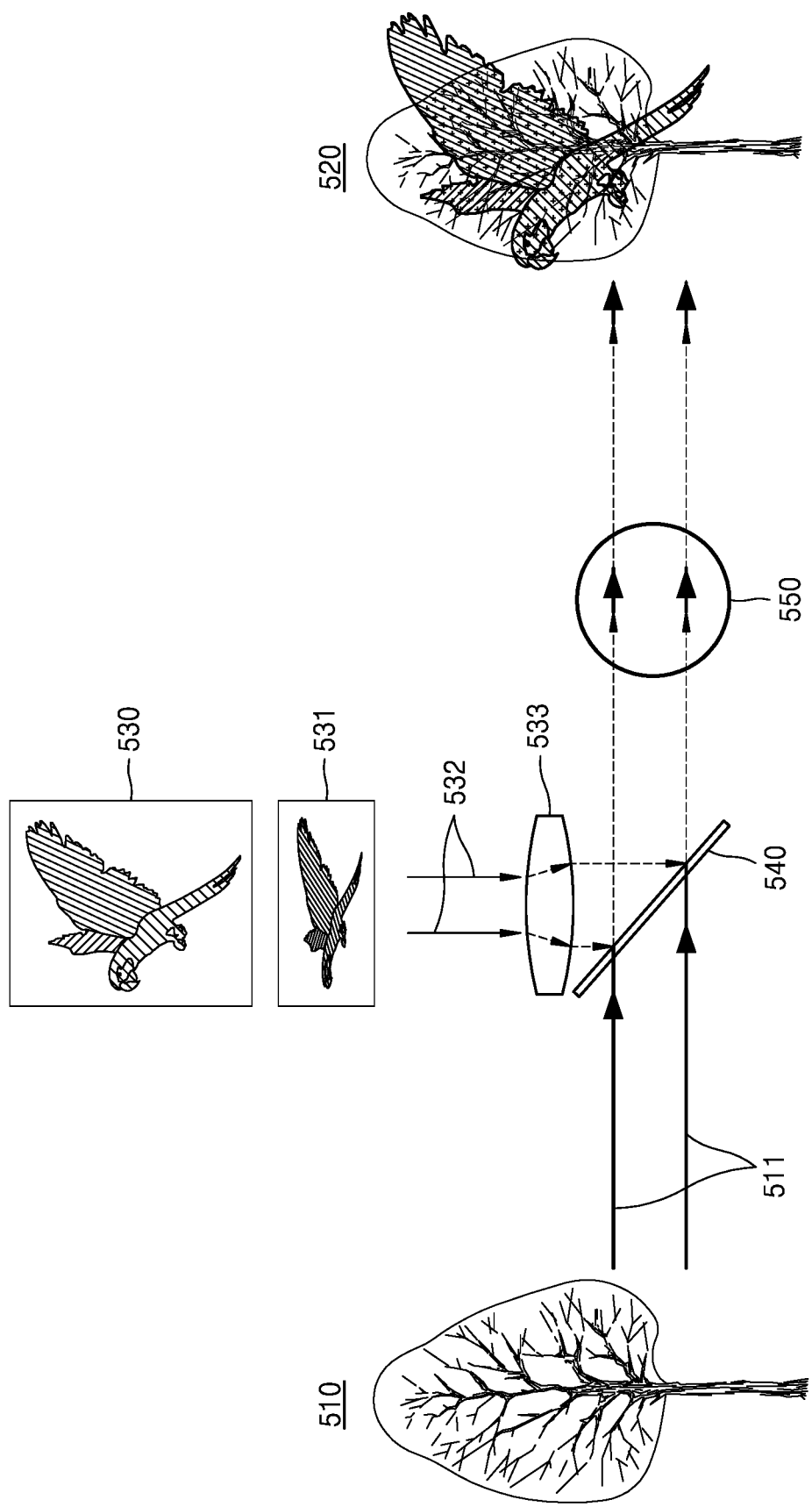
FIG. 5 shows an example of a real object and content that are recognized by a user, according to an embodiment.

FIG. 5 shows an example of a real object and content that are recognized by a user, according to an embodiment.

A signal 511 for a real object 510 and a signal 532 for content 530 may be recognized by a user's eye through a translucent mirror 540. The signal 532 for the content 530 may be projected on the translucent mirror 540 through a display 531 and a lens 533.

According to an embodiment, a signal 550 resulting from combining the signal 511 for the real object 510 with the signal 532 for the content 532 may be reflected by the translucent mirror 540. Accordingly, the user may recognize an image 520 in which the real object 510 is combined with the content 530, through the translucent mirror 540.

However, the image 520 recognized by the user may be in a state in which a color of the content 530 is distorted at an area where the real object 510 overlaps with the content 530, due to a color of the real object 510, as shown in FIG. 5.

For example, at the area where the real object 510 overlaps with the content 530, the user may recognize, instead of an original color of the content 530, a mixed color of the color of the content 530 and the color of the real object 510.

Figure 6:
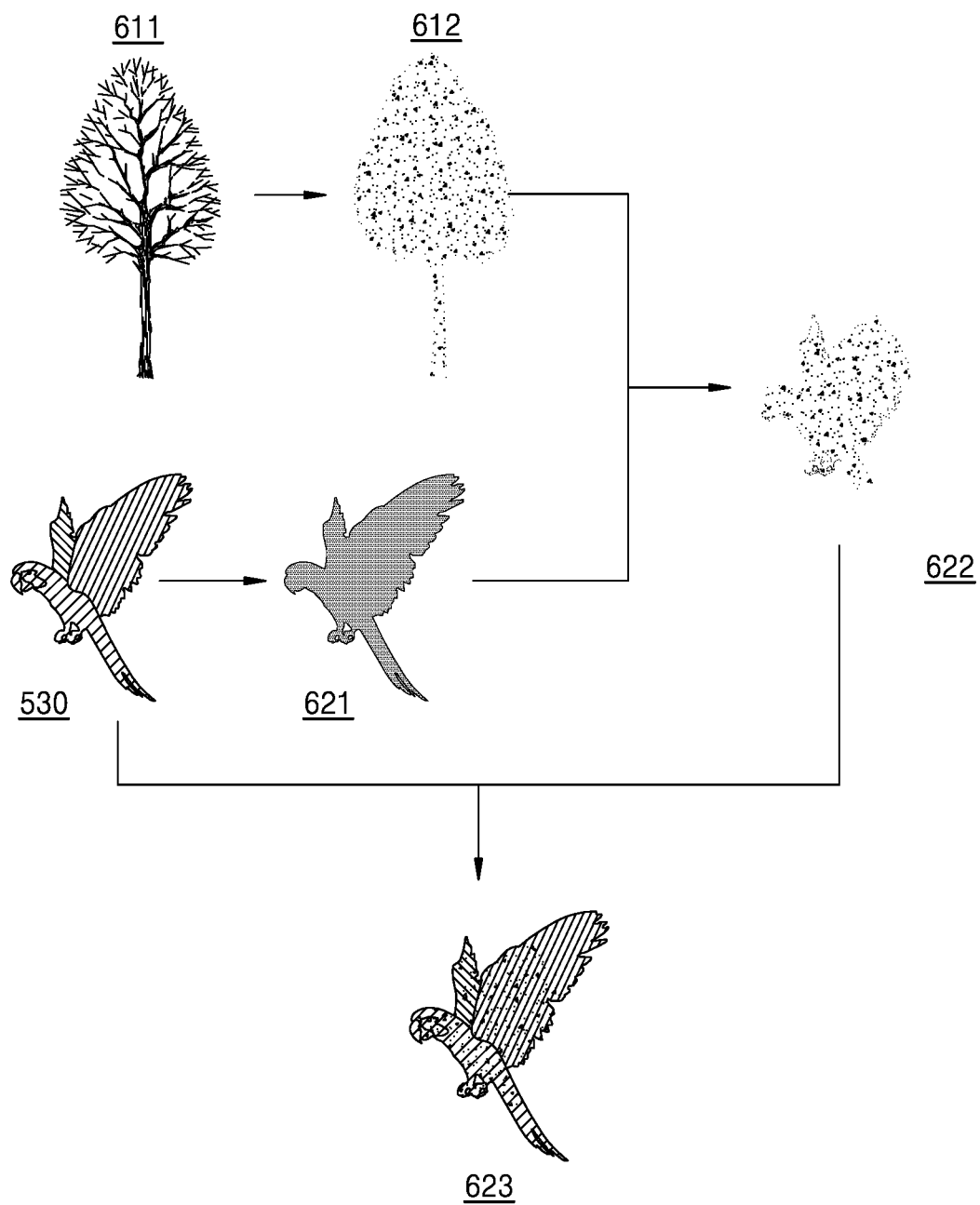
FIG. 6 shows an example of correcting content based on a photographed image of a real object, according to an embodiment.

FIG. 6 shows an example of correcting content based on a photographed image of a real object, according to an embodiment.

Referring to FIG. 6, a photographed image 611 of the real object 510 may be obtained by the camera 313 of the electronic device 312 according to an embodiment. The photographed image 611 of the real object 510 may include the same image as that of the real object 510 recognized by the user through the translucent mirror 540.

The electronic device 312 according to an embodiment may correct the photographed image 611 of the real object 510. The electronic device 312 may correct pixel values of the photographed image 611 to values that are canceled when a corrected image is combined with the photographed image 611.

For example, the electronic device 312 may replace each pixel value of the photographed image 611 with a value obtained by subtracting the pixel value from a predefined reference value, thereby generating an image 612 with corrected pixel values. Also, the electronic device 312 may perform color reversal on the photographed image 611 to generate the image 612 with corrected pixel values.

According to an embodiment, operation of reversing colors of an image may be operation of changing pixel values of the image to their inverse values. For example, in color value gradations of 256 levels, a pixel having a pixel value of 255 may be converted to 0, and a pixel having a pixel value of 0 may be converted to 255.

Also, the electronic device 312 may generate an outline 621 for content 530 of augmented reality or mixed reality. The electronic device312 may identify an area that may be recognized by the user to overlap with the content 530 in the photographed image 611, based on the outline 621 for the content 530, and generate an image 622 corresponding to the identified area from the image 612 with corrected pixel values. The image 622 corresponding to the identified area may include the area overlapping with the content 530 in the image 612 with corrected pixel values.

The electronic device 312 according to an embodiment may correct the content 530 by using the image 622 with corrected pixel values in the identified area. For example, the electronic device 312 may combine the image 622 with corrected pixel values with the content 530 to obtain corrected content 623.

However, the electronic device 312 may identify an area where the content 530 will overlap with the real object 510 in the photographed image 611 of the real object 510, based on the outline 621 of the content 530, before correcting the pixel values of the photographed image 611. Then, the electronic device 312 may correct the content 530 by using the image 622 with corrected pixel values, in the identified area.

The electronic device 312 may output the corrected content 623, instead of the content 530, through the display 531. Although the corrected content 623 overlaps the photographed image 611 on the translucent mirror 316, the photographed image 611 may be canceled by the corrected image 622 combined with the corrected content 623. Accordingly, the content 530 having minimized distortion caused by the overlapping real object 510 to be similar to its original may be recognized by the user.

Figure 7:
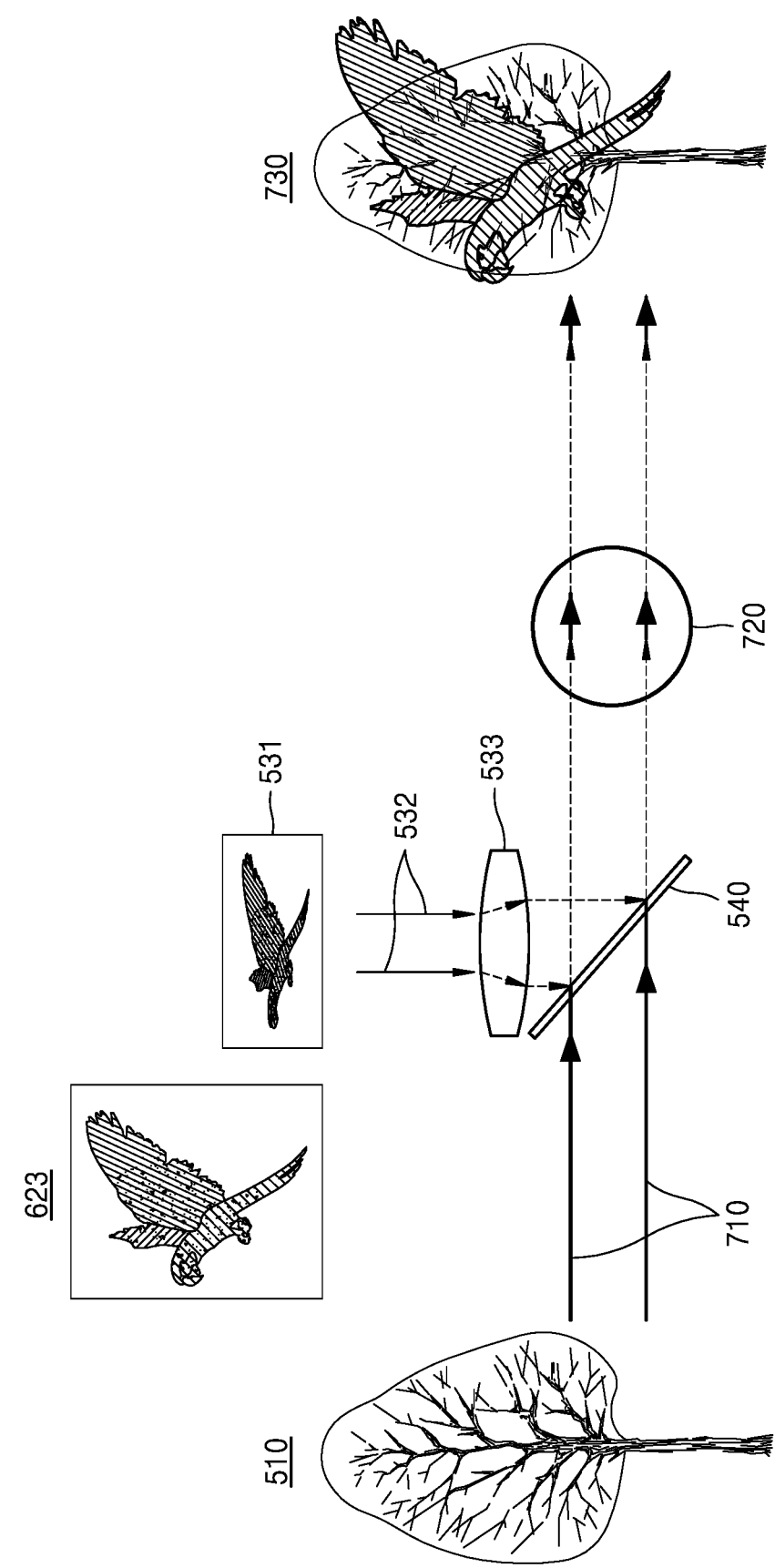
FIG. 7 shows an example of displaying corrected content, according to an embodiment.

FIG. 7 shows an example of displaying corrected content, according to an embodiment.

Referring to FIG. 7, unlike the example shown in FIG. 5, the corrected content 623 according to an embodiment may be output through the display 531. Because the corrected content 623 includes pixel values capable of cancelling the photographed image 611, the photographed image 611 overlapping with the corrected content 623 may be canceled. Accordingly, the user may recognize an image 730 including the content 623 with minimized color distortion caused by the overlapping real object 510.

Also, because the content 623 is content corrected such that its color distortion by the real object 510 is minimized, the user may clearly recognize the content 530 for providing augmented reality or mixed reality, and accordingly, the user's sense of reality or the user's sense of immersion in augmented reality or mixed reality may further increase.

Figure 8:
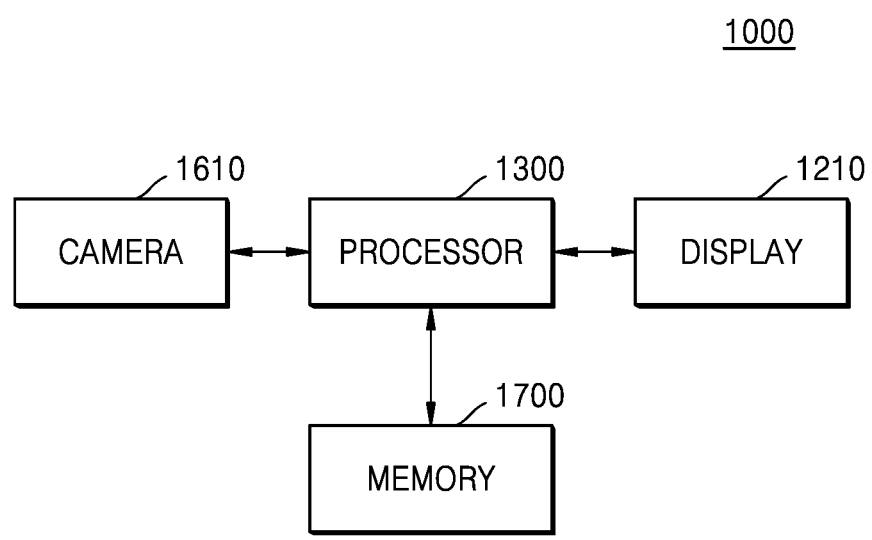
FIGS. 8 and 9 are block diagrams showing internal structures of an electronic device according to an embodiment.
Figure 9:
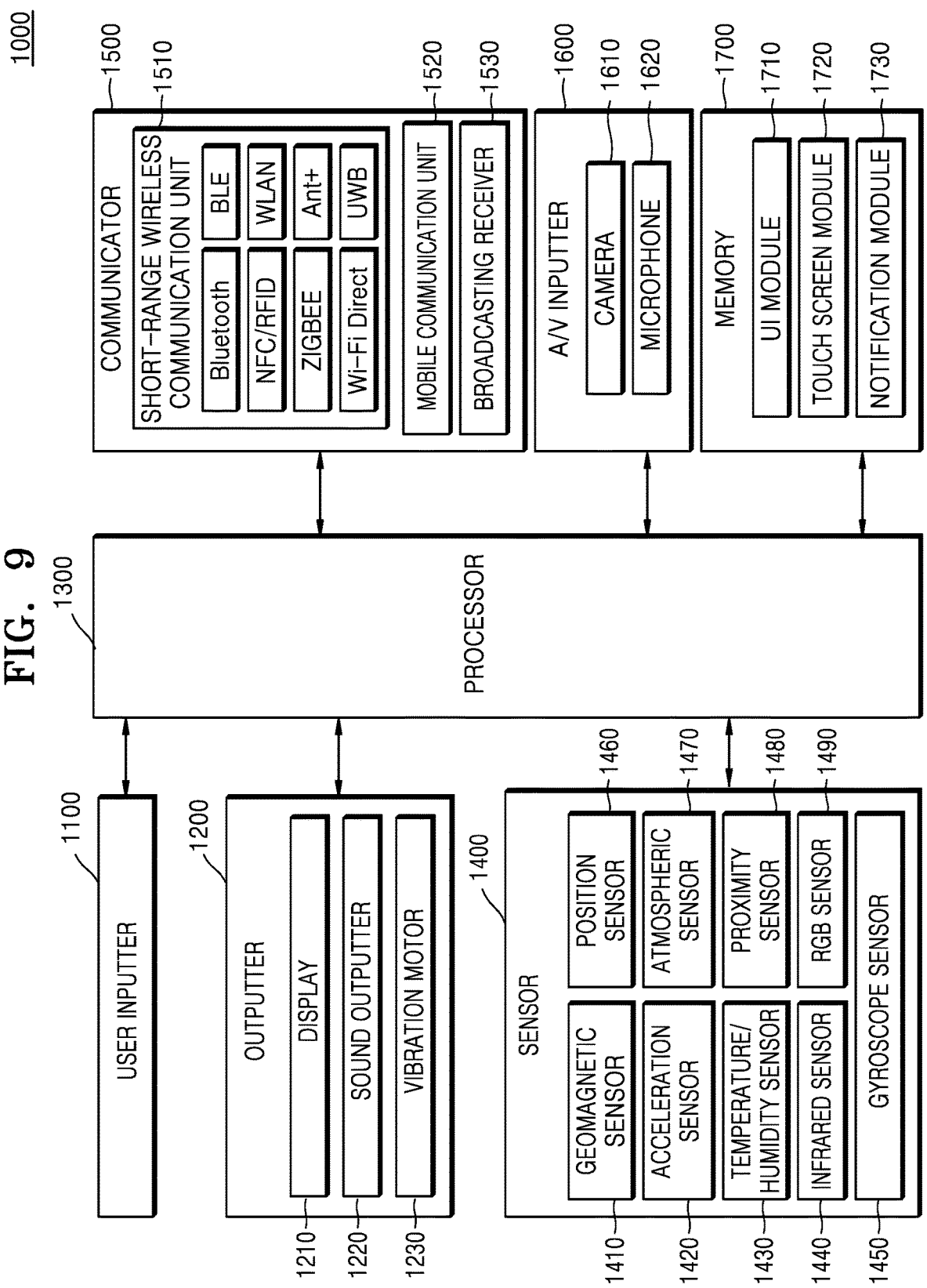

FIGS. 8 and 9 are block diagrams showing internal structures of an electronic device according to an embodiment of the disclosure.

Referring to FIG. 8, an electronic device 1000 according to an embodiment may include a camera 1610, a processor 1300, a display 1210, and a memory 1700. The electronic device 1000, the camera 1610, and the display 1210 shown in FIG. 8 may respectively correspond to the electronic device 312, the camera 313, and the display 314 shown in FIGS. 3 and 4.

However, the components shown in FIG. 8 may be not essential components of the electronic device 1000. The electronic device 1000 may be configured with more components than those shown in FIG. 8 or with less components than those shown in FIG. 8.

For example, as shown in FIG. 9, the electronic device 1000 according to some embodiments may further include a user inputter 1100, a communicator 1500, an outputter 1200, a sensor 1400, and an A/V inputter 1600, in addition to the camera 1610, the memory 1700, the display 1210, and the processor 1300.

The user inputter 1100 may be means to enable a user to input data for controlling the electronic device 1000. For example, the user inputter 1100 may include a key pad, a dome switch, a touch pad (a capacitive type, a resistive type, an infrared beam type, a surface acoustic wave type, an integral strain gauge type, a piezo effect type, etc.), a jog wheel, a jog switch, etc., although not limited thereto.

According to an embodiment, the user inputter 1100 may receive a user input for implementing augmented reality or mixed reality.

The outputter 1200 may output an audio signal, a video signal, or a vibration signal. The outputter 1200 may include the display 1210, a sound outputter 1220, and a vibration motor 1230.

The display 1210 may display information processed by the electronic device 1000. For example, the display 1210 may display content for implementing augmented reality or mixed reality, according to an embodiment.

According to an embodiment, the content for implementing augmented reality or mixed reality may be corrected based on a photographed image of external reality that may be recognized by a users eye, and then displayed. Therefore, according to an embodiment, the user may recognize content with minimized distortion caused by external reality.

Meanwhile, when the display 1210 and the touch pad form a layer structure to be configured as a touch screen, the display 1210 may be used as an input device, as well as an output device. The display 1210 may include at least one of a liquid crystal display (LCD), a thin film transistor-liquid crystal display (TFT-LCD), an organic light-emitting diode (OLED) display, a flexible display, a 3 dimensional (3D) display, or an electrophoretic display. Also, according to an implementation type of the electronic device 1000, the electronic device 1000 may include two or more displays 1210.

The sound outputter 1220 may output audio data that is received from the communicator 1500 or stored in the memory 1700.

The vibration motor 1230 may output vibration signals. Also, the vibration motor 1230 may output a vibration signal when a touch is input to the touch screen.

The processor 1300 may control overall operations of the electronic device 1000. For example, the processor 1300 may execute programs stored in the memory 1700 to control overall operations of the user inputter 1100, the outputter 1200, the sensor 1400, the communicator 1500, the A/V inputter 1600, etc.

More specifically, the processor 1300 may control the camera 1610 to photograph a reality image including external reality that may be recognized by the user. Also, the processor 1300 may correct content for implementing augmented reality or mixed reality by using the reality image photographed by the camera 1610. Also, the processor 1300 may control the display 1210 to display the corrected content.

The sensor 1400 may sense a state of the electronic device 1000 or a state of surroundings of the electronic device 1000, and transfer sensed information to the processor 1300.

The sensor 1400 may include at least one among a magnetic sensor 1410, an acceleration sensor 1420, a temperature/humidity sensor 1430, an infrared sensor 1440, a gyroscope sensor 1450, a position sensor (for example, a global positioning system (GPS)) 1460, an atmospheric pressure sensor 1470, a proximity sensor 1480, or a RGB sensor (illuminance sensor) 1490, although not limited thereto.

The communicator 1500 may include one or more components to enable the electronic device 1000 to communicate with another electronic device (not shown) or an external device (not shown). For example, the communicator 1500 may include a short-range wireless communication unit 1510, a mobile communication unit 1520, and a broadcast receiver 1530.

The short-range wireless communication unit 1510 may include a Bluetooth communicator, a Bluetooth low energy (BLE) communicator, a near field communication (NFC) unit, a wireless local area network (WLAN) communicator, a Zigbee communicator, an infrared data association (IrDA) communicator, a Wi-Fi Direct (WFD) communicator, an ultra wideband (UWB) communicator, an Ant+ communicator, and the like, although not limited thereto.

The mobile communication unit 1520 may transmit/receive wireless signals to/from at least one of a base station, an external terminal, or a server on a mobile communication network. The wireless signal may include a voice call signal, a video call signal or various formats of data according to transmission/reception of text/multimedia messages.

The broadcast receiver 1530 may receive broadcasting signals and/or broadcasting-related information from outside through a broadcast channel. The broadcast channel may include a satellite channel and a terrestrial channel. According to implementation examples, the electronic device 1000 may not include the broadcast receiver 1530.

According to an embodiment, the communicator 1500 may transmit/receive data to/from an external device (not shown). For example, the communicator 1500 may receive content for providing augmented reality or mixed reality by the processor 1300 from an external device.

The AN inputter 1600 may be used for input of an audio signal or a video signal, and may include a camera 1610 and a microphone 1620. The camera 1610 may acquire an image frame, such as a still image or a moving image, through an image sensor in a video call mode or a photographing mode. An image captured by the image sensor may be processed by the processor 1300 or a separate image processor (not shown). According to an embodiment, a video signal generated by the camera 1610 of the AN inputter 1600 may include external reality that can be recognized by a user, and content for providing augmented reality or mixed reality may be corrected based on the video signal including the external reality.

The microphone 1620 may receive a sound signal from the outside and process the sound signal into electrical voice data. For example, the microphone 1620 may receive a sound signal from an external device or a speaker. According to an embodiment, the processor 1300 may perform a predefined operation for providing augmented reality or mixed reality to a user, based on the sound signal received by the microphone 1620.

The memory 1700 may store programs for processing and control of the processor 1300, and store data input to the electronic device 1000 or to be output from the electronic device 1000. The memory 1700 according to an embodiment may store an image of external reality photographed by the camera 1610. Also, the memory 1700 may store content for providing augmented reality or mixed reality, the content corrected according to an embodiment.

The memory 1700 may include at least one type of storage medium among a flash memory type, a hard disk type, a multimedia card micro type, a card type memory (for example, secure digital (SD) or extreme digital (XD) memory), random access memory (RAM), static random access memory (SRAM), read only memory (ROM), electrically erasable programmable read-only memory (EEPROM), programmable read-only Memory (PROM), a magnetic memory, a magnetic disk, or an optical disk.

The programs stored in the memory 1700 may be classified into a plurality of modules according to their functions, and for example, the programs may be classified into a UI module 1710, a touch screen module 1720, a notification module 1730, etc.

The UI module 1710 may provide a specialized user interface (UI) or graphic user interface (GUI) interworking with the electronic device 1000 for each application. The touch screen module 1720 may sense a users touch gesture made on a touch screen, and transfer information about the users touch gesture to the processor 1300. The touch screen module 1720 according to an embodiment may recognize and analyze a touch code. The touch screen module 1720 may be configured with separate hardware including a controller.

Various sensors may be installed inside or around the touch screen to sense a touch or proximity touch made on the touch screen. An example of a sensor for sensing a touch made on the touch screen is a tactile sensor. The tactile sensor may be a sensor for sensing a contact of a specific object, which may be felt by a human. The tactile sensor may sense various information, such as roughness of a contact surface, stiffness of a contact object, temperature of a contact point, etc.

The users touch gesture may include tap, touch & hold, double tap, drag, panning, flick, drag & drop, swipe, etc.

The notification module 1730 may generate a signal for informing event occurrence of the electronic device 1000.

Figure 10:
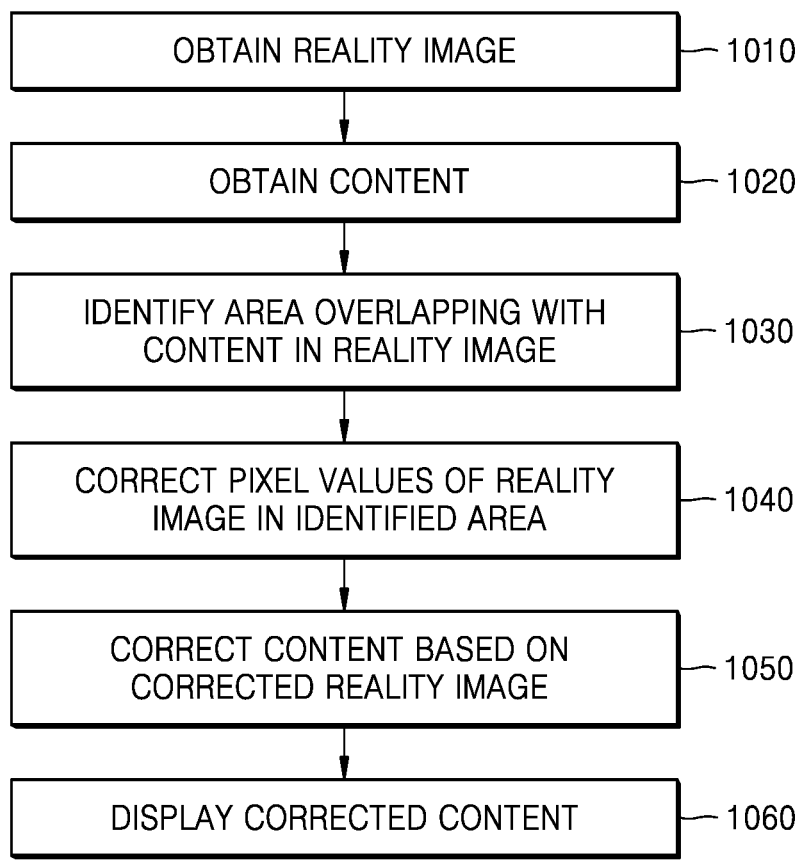
FIG. 10 is a flowchart showing a method of displaying content, according to an embodiment.

FIG. 10 is a flowchart showing a method of displaying content, according to an embodiment of the disclosure.

Referring to FIG. 10, in operation 1010, the electronic device 1000 may obtain a reality image by photographing external reality. The external reality may include an image that a user experiencing augmented reality or mixed reality by using the electronic device 1000 can recognize through his/her eyes.

In operation 1020, the electronic device 1000 may obtain content for providing augmented reality or mixed reality. For example, the electronic device 1000 may load content stored in the memory 1700 or receive content from an external device to thereby obtain the content.

In operation 1030, the electronic device 1000 may identify an area overlapping with the content obtained in operation 1020 in the reality image obtained in operation 1010. The area of the reality image overlapping with the content may be an area where the content overlaps with the external reality in an image recognized by the users eye when the user experiences augmented reality or mixed reality by using the electronic device 1000.

According to an embodiment, content of augmented reality or mixed reality recognized by the user's eye may be distorted by the image of the external reality overlapping with the content. Accordingly, the electronic device 1000 may correct the content that may be distorted by the image of the external reality by using the reality image resulting from photographing the external reality, and display the corrected content.

In operation 1040, the electronic device 1000 may correct the reality image in the area identified in operation 1030. The electronic device 1000 may correct the reality image such that the reality image is canceled when the reality image is combined with the corrected reality image.

For example, as a method of correcting pixel values of the reality image, the electronic device 1000 may reverse a color of the reality image. Also, the electronic device 1000 may replace each pixel value of the reality image with a value obtained by subtracting the pixel value from a predefined reference value, thereby correcting the pixel value of the reality image, although not limited thereto. However, the electronic device 1000 may correct the reality image by various methods and use the corrected reality image to correct the content.

In operation 1050, the electronic device 1000 may correct the content based on the reality image with pixel values corrected in operation 1040. For example, the electronic device 1000 may combine the corrected reality image with the content to correct the content.

According to an embodiment, the reality image with pixel values corrected according to various methods may be combined with the content. For example, by an interleaving method of alternately arranging pixels of the reality image with corrected pixel values with pixels of the content, the reality image with corrected pixel values may be combined with the content.

Each pixel may have such a small size that a user has difficulties in distinguishing and recognizing the pixel. Accordingly, when the pixel values are alternately arranged by the interleaving method, the user may recognize each pixel value of an image as a sum value of a pixel value of the reality image with corrected pixel values and a pixel value of the content.

Also, by adding a value of each pixel of the reality image with corrected pixels to a value of a pixel of the content corresponding to the pixel of the reality image, the reality image with corrected pixel values may be combined with the content, although not limited thereto. However, the electronic device 1000 may combine the reality image with corrected pixel values with the content by various methods.

In operation 1060, the electronic device 1000 may display the content corrected in operation 1050. For example, the electronic device 1000 may display the content corrected according to an embodiment through the display 1210 to project the corrected content on the translucent mirror 316 of the optical device 400. The user may recognize the content projected on the translucent mirror 316 to experience augmented reality or mixed reality.

Because the content corrected according to an embodiment includes pixel values capable of canceling the image of external reality, the image of the external reality overlapping with the corrected content may be canceled. Accordingly, the user may recognize the content with minimized color distortion caused by a real object overlapping on the translucent mirror 316.

Figure 11:
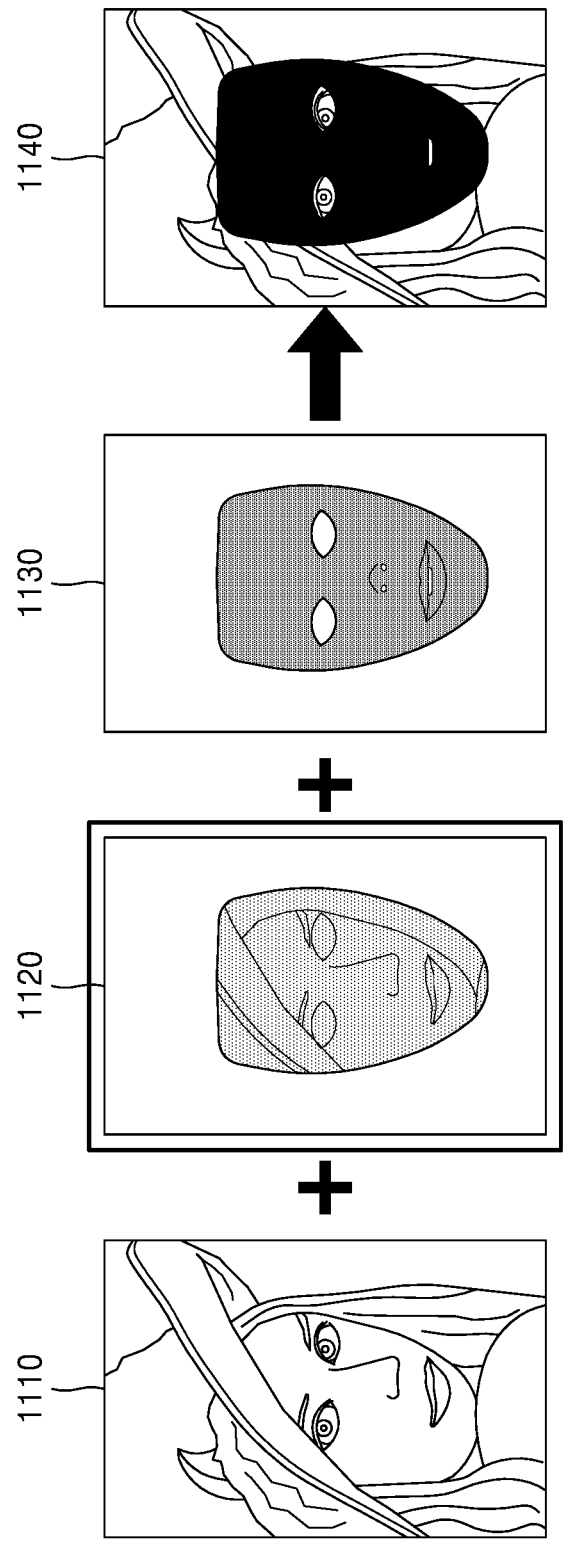
FIG. 11 shows an example of content for providing a user with augmented reality or mixed reality, according to an embodiment.

FIG. 11 shows an example of content for providing a user with augmented reality or mixed reality, according to an embodiment of the disclosure.

1110 of FIG. 11 shows an example of external reality that can be recognized by a user. The electronic device 1000 may obtain an image 1110 shown in FIG. 11 as a reality image resulting from photographing external reality, wherein the reality image may be used to correct content according to an embodiment.

1120 represents an example of an area overlapping with content in the reality image resulting from photographing the external reality based on an image recognized by the user, wherein pixel values of the area have been corrected. For example, the electronic device 1000 may correct the reality image, by reversing a color of the area overlapping with the content or replacing each pixel value with a value obtaining by subtracting the pixel value from a reference value, in the reality image.

1130 shows an example of content for providing the user with augmented reality or mixed reality. The content 1130 may be obtained from the memory 1700 of the electronic device 1000 or an external device, before being corrected according to an embodiment.

1140 shows an example of an image in which content corrected according to an embodiment overlaps with the external reality. According to an embodiment, the user may recognize the image 1140 through the translucent mirror 316.

According to an embodiment, the content 1130 being in a shape of a mask may overlap with an image of a woman being the external reality, and a result of the overlapping may be recognized by the user. However, the content 1130 may be combined with a corrected image 1120 of the external reality and projected on the translucent mirror 316, so that the overlapping image of the external reality may be canceled by the corrected image 1120 of the external reality. Accordingly, distortion of the content 1130 recognized by the user, caused by the image of the external reality, may be minimized.

Figure 12:
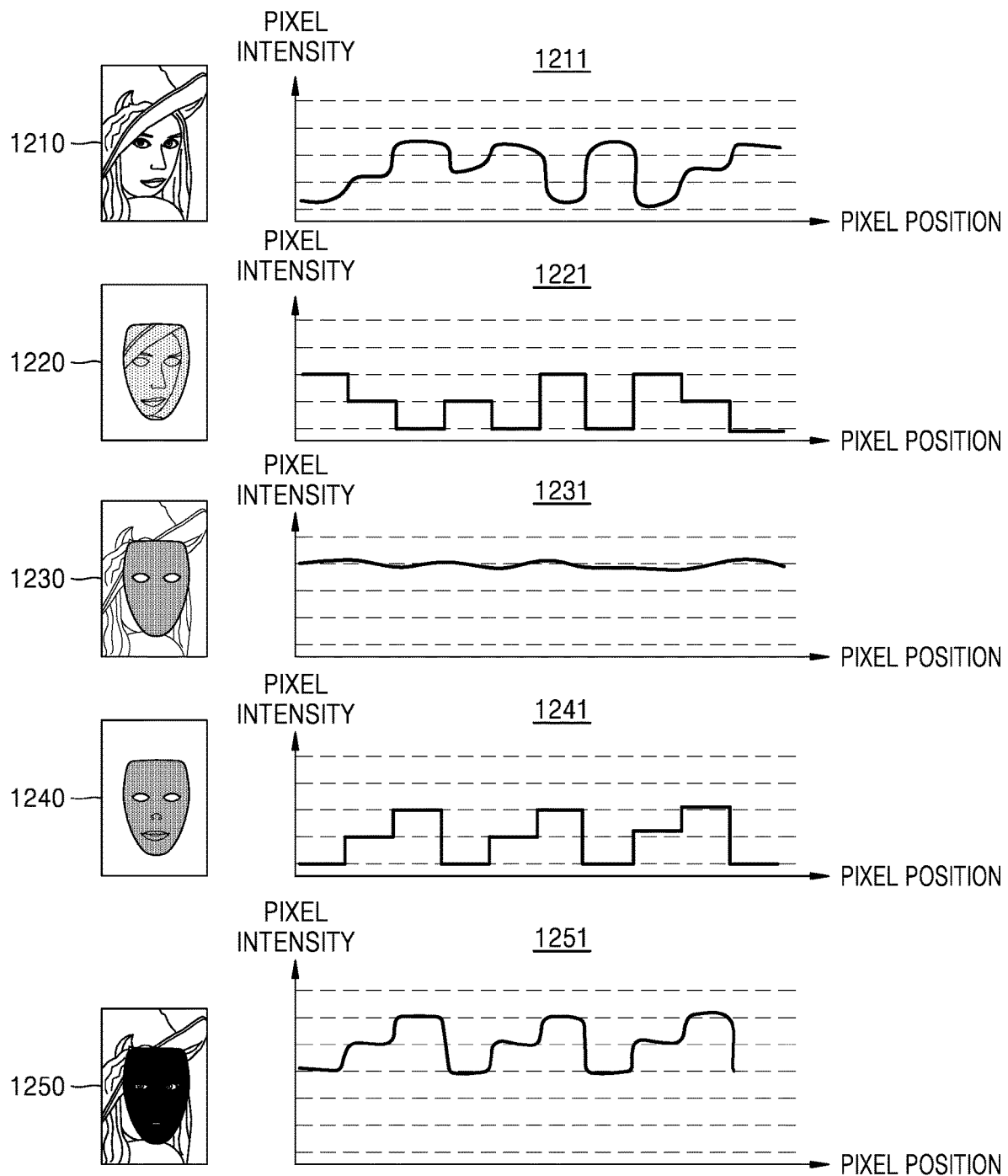
FIG. 12 shows an example of correcting content, according to an embodiment.

FIG. 12 shows an example of correcting content, according to an embodiment of the disclosure.

1210 of FIG. 12 may correspond to 1110 shown in FIG. 11, and shows an example of external reality that can be recognized by a user. A graph 1211 represents pixel values of a reality image 1210 on an axis of the reality image 1210.

1220 may correspond to 1120 shown in FIG. 11, and shows an example of an area overlapping with content in the reality image 1210 obtained by photographing external reality, wherein pixel values of the area have been corrected. For example, pixel values of the reality image 1210 may be corrected to values that are canceled when the reality image 1210 is combined with a corrected reality image.

According to an embodiment, as shown in a graph 1221, the pixel values of the reality image 1210 may be corrected to values obtained by subtracting the pixel values of the reality image 1210 shown in the graph 1211 from a predefined reference value. The predefined reference value may be determined to be, for example, a maximum value of pixel values in the area overlapping with the content, wherein the pixel values of the reality image 1210 are corrected in the area. Also, the pixel values of the reality image 1210 may be corrected by performing color reversal on the reality image 1210, although not limited thereto. However, the pixel values of the reality image may be corrected according to various methods.

1230 may be an image obtained by combining the reality image 1210 with a reality image 1220 of which pixel values have been corrected. As shown in a graph 1231, when the reality image 1210 is combined with the reality image 1220 of which the pixel values have been corrected, the pixel values in the area overlapping with the content may become a constant value. For example, pixel values of the image 1230 may be the predefined reference value described above.

1240 may correspond to 1130 shown in FIG. 11, and shows content for implementing augmented reality or mixed reality according to an embodiment. A graph 1241 represents pixel values of an image 1240 on an axis of the image 1240.

1250 may correspond to 1140 shown in FIG. 11, and shows an example of an image in which content corrected according to an embodiment overlaps with the external reality. According to an embodiment, because pixel values of the images 1210, 1220, and 1240 are combined and displayed, the user may finally recognize an image 1250 obtained by combining the image 1240 with the image 1230 resulting from combining the image 1210 with the image 1220.

Accordingly, by the content corrected according to an embodiment, the pixel values of the reality image 1210 in the area where the content overlaps with the reality image 1210 may be canceled to have a constant value, as shown in the image 1230, and the image 1230 may overlap with the image 1240 of the content. Therefore, distortion of the content recognized by the user, caused by the pixel values of the reality image 1210, may be minimized.

Figure 13:
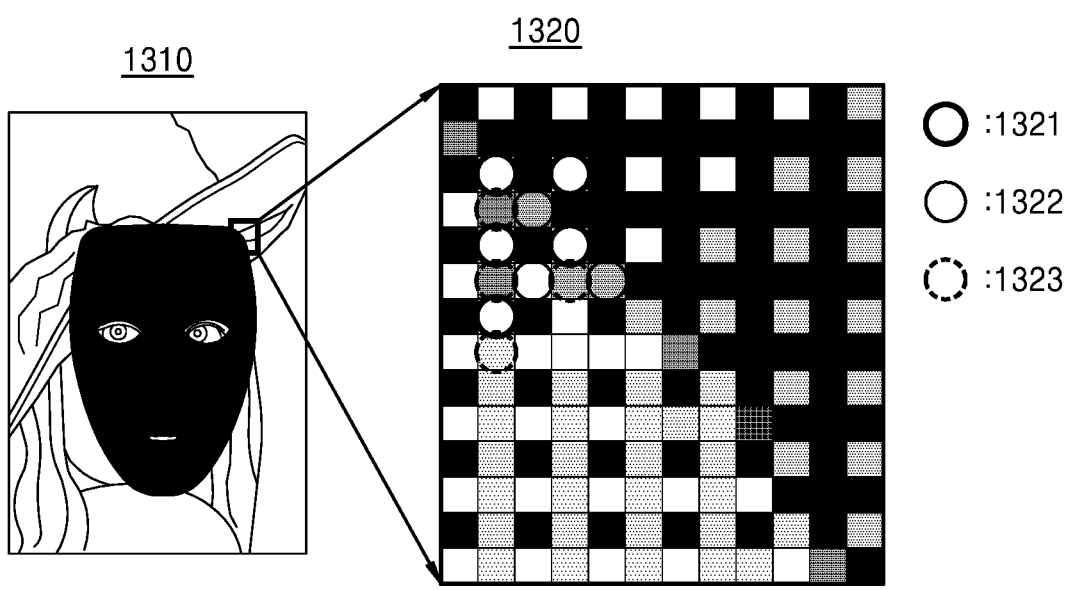
FIG. 13 shows an example of content corrected according to an embodiment.

FIG. 13 shows an example of content corrected according to an embodiment of the disclosure.

Referring to FIG. 13, 1310 represents an example of an image in which content corrected according to an embodiment overlaps with external reality. The image 1310, in which the content corrected according to an embodiment overlaps with the external reality, may be an image that can be recognized by a user. Also, 1320 represents an enlarged view of a boundary of the content and the external reality in the image 1310.

In 1320, areas indicated by marks 1321 represent areas displaying the external reality. Areas indicated by marks 1322 represent areas displaying original content not yet corrected. Areas indicated by marks 1323 represent corrected areas of an image of the external reality according to an embodiment.

As shown in an example of 1320, the electronic device 100 may display corrected content such that pixels of external reality, original content, and a corrected external reality image are alternately arranged.

For example, the electronic device 1000 may segment an image area into a plurality of 2×2 blocks, and assign areas in which external reality, original content, and a corrected external reality image are to be displayed to each block. When generating corrected content, the electronic device 1000 may empty the areas 1321 in which the external reality is to be displayed from the block, so that the user can recognize the areas 1321 through the translucent mirror 316. Also, the electronic device 1000 may assign, to the areas 1322 in which the original content is displayed and the areas 1323 of the corrected external reality image, the corresponding pixels of the original content and the corresponding pixels of the corrected external reality image, respectively, thereby generating the corrected content according to an embodiment. Pixel values of the remaining area of the block except for the assigned areas may be processed to 0 and displayed black, as shown in FIG. 13.

According to an embodiment, the electronic device 1000 may combine original content with a corrected external reality image according to the interleaving method of alternately arranging pixels of a plurality of images to generate corrected content, as shown in FIG. 13. Because a pixel size is very small, a user's eyes may recognize an image as a sum of pixel values included in each block. For example, the user may clearly recognize original content because an external reality image overlapping with the content is canceled by a corrected external reality image, although not limited thereto.

However, the electronic device 1000 may combine original content with a corrected external reality image by various methods, thereby generating corrected content.

According to an embodiment, content for implementing augmented reality or mixed reality may be displayed without being distorted by external reality.

An embodiment may be implemented in the form of a computer-readable recording medium including an instruction that is executable by a computer, such as a program module that is executed by a computer. The computer-readable recording medium may be an arbitrary available medium which is able to be accessed by a computer, and may include a volatile or non-volatile medium and a separable or non-separable medium. Further, the computer-readable recording medium may include a computer storage medium and a communication medium. The computer storage medium may include volatile and non-volatile media and separable and non-separable media implemented by an arbitrary method or technology for storing information such as a computer readable instruction, a data structure, a program module, or other data. The communication medium may typically include computer-readable instructions, data structures, or program modules, and include an arbitrary information transfer medium.

Also, in the disclosure, the terms "portion", "module", etc. may be a hardware component such as a processor or a circuit, and/or a software component that is executed by a hardware component such as a processor.

The aforementioned descriptions are only for illustrative purposes, and it will be apparent that those of ordinary skill in the art may make various modifications thereto without changing the technical spirit and essential features of the present disclosure. Thus, it should be understood that the exemplary embodiments described above are merely for illustrative purposes and not for limitation purposes in all aspects. For example, each component described as a single type may be implemented in a distributed type, and components described as distributed may be implemented in a combined form.

The scope of the present disclosure would be indicated by the claims, which will be described later, the spirit and scope of the claims, and all such modifications as would be derived from the equivalent concept intended to be included within the scope of the present disclosure.

The invention claimed is:

1. A method for displaying content on an electronic device, the method comprising:
   obtaining a photographed reality image by photographing external reality, while the external reality is projected onto a translucent screen of the electronic device, as a projected reality image;
   obtaining a virtual content to be overlapped with the projected reality image;
   identifying an overlapping area between the virtual content and the projected reality image on the translucent screen, based on the photographed reality image;
   correcting pixel values of the projected reality image in the identified overlapping area to a non-zero constant value;
   correcting the virtual content based on the corrected pixel values of the projected reality image; and
   displaying the corrected virtual content.

2. The method of claim 1, wherein the translucent screen is formed with a translucent mirror, and wherein the corrected virtual content is projected on the translucent mirror through a display to overlap with the external reality on the translucent mirror.

3. The method of claim 1, wherein the correcting of the virtual content comprises combining the virtual content with the projected reality image having the pixel values corrected by arranging pixels of the projected reality image alternately with pixels of the virtual content.

4. The method of claim 1, wherein the correcting of the virtual content comprises generating the corrected pixel values by adding a value of each pixel of the projected reality image to a value of each pixel of the virtual content, and combining the virtual content with the projected reality image that has the corrected pixel values.

5. An electronic device comprising:
   a display;
   a camera;
   a memory storing one or more instructions; and
   a processor configured to execute the one or more instructions stored in the memory,
   wherein the processor is further configured to:

obtain a photographed reality image by photographing external reality, while the external reality is projected onto a translucent screen of the electronic device, as a projected reality image;

obtain a virtual content to be overlapped with the projected reality image;

identify an overlapping area between the virtual content and the projected reality image on the translucent screen, based on the photographed reality image;

correct pixel values of the projected reality image in the identified overlapping area to a non-zero constant value;

correct the virtual content based on the corrected pixel values of the photographed reality image; and control the display to display the corrected virtual content.

6. The electronic device of claim 5, wherein the translucent screen is formed with a translucent mirror, and wherein the corrected virtual content is projected on the translucent mirror through the display to overlap with the external reality on the translucent mirror.

7. The electronic device of claim 5, wherein the processor is further configured to combine the virtual content with the projected reality image having the pixel values corrected by arranging pixels of the projected reality image alternately with pixels of the virtual content.

8. The electronic device of claim 5, wherein the processor is further configured to generate the corrected pixel values by adding a value of each pixel of the projected reality image to a value of each pixel of the virtual content, and combine the virtual content with the projected reality image that has the corrected pixel values.

9. A computer program product including a non-transitory recording medium storing a program for performing operations of:

obtaining a photographed reality image by photographing external reality, while the external reality is projected onto a translucent screen of an electronic device, as a projected reality image;

obtaining a virtual content to be overlapped with the projected reality image;

identifying an overlapping area between the virtual content and the projected reality image on the translucent screen, based on the photographed reality image;

correcting pixel values of the projected reality image in the identified overlapping area to a non-zero constant value;

correcting the virtual content based on the corrected pixel values of the photographed reality image; and displaying the corrected virtual content.

* * * * *